Patented Sept. 18, 1923.

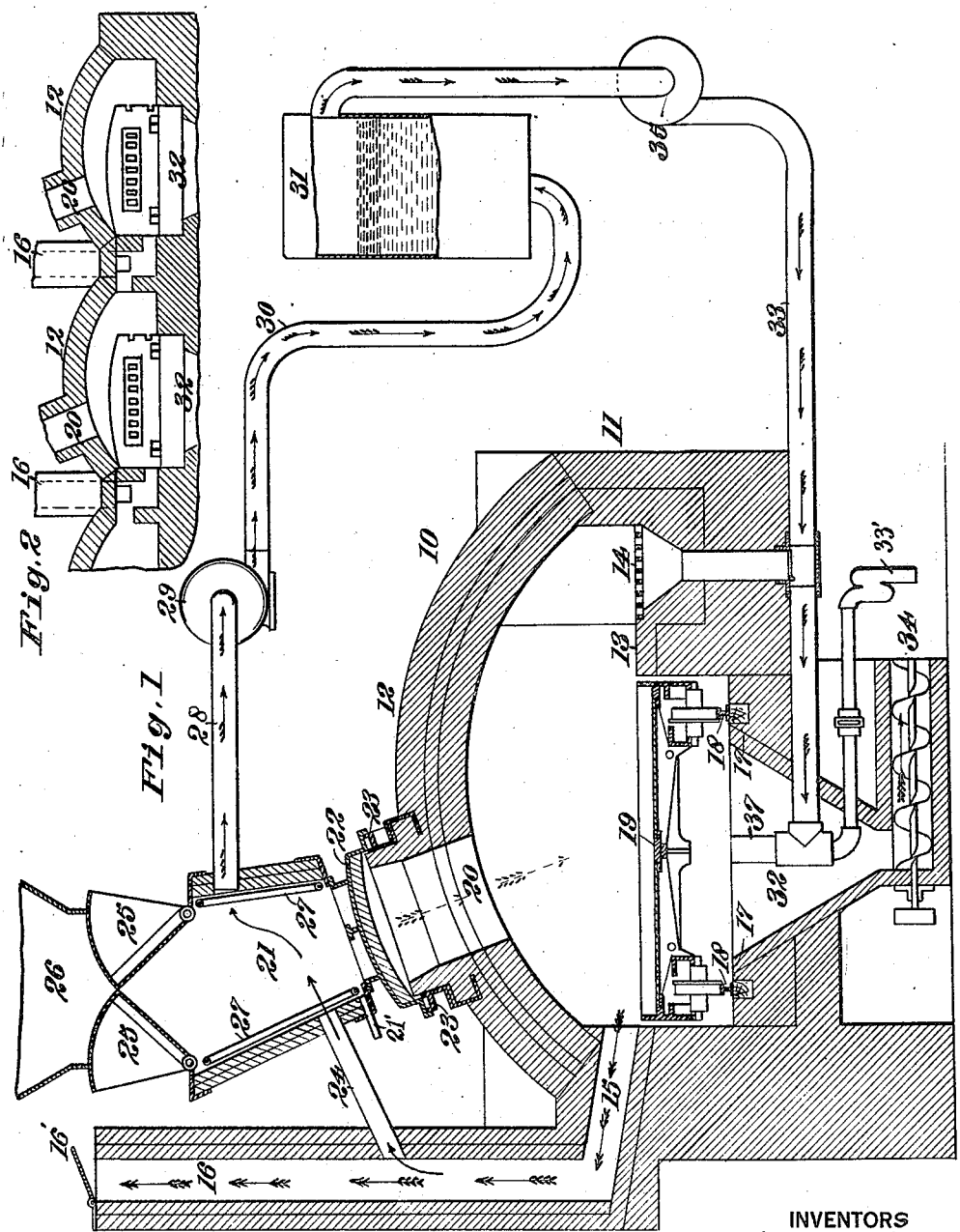

1,468,137

UNITED STATES PATENT OFFICE.

FREDERICK H. COLLINS AND MARTIN L. PELLETT, OF VALLEJO, CALIFORNIA.

PROCESS OF GARBAGE INCINERATION.

Application filed January 22, 1919. Serial No. 272,573.

*To all whom it may concern:*

Be it known that we, FREDERICK H. COLLINS and MARTIN L. PELLETT, citizens of the United States, residing at Vallejo, in the county of Solano and State of California, have invented new and useful Improvements in Processes of Garbage Incineration, of which the following is a specification.

This invention relates to a process of garbage incineration, as partially involved in the apparatus disclosed in our patent entitled "Incinerator," issued June 19, 1917, and bearing the Number 1,230,380.

It is the principal object of the present invention to provide a process by which garbage and other refuse may be economically destroyed by the use of a minimum amount of fuel and with the result that complete destruction of the garbage will take place as well as a desirable recovery of the oils and fats made therefrom. This process represents an economical manner of disposing of the garbage in large cities and insures that a large volume of refuse may be destroyed at a very small cost in comparison to processes now in use.

Briefly considered, the process involves the use of a furnace within which the garbage is incinerated and to which it is delivered from a drying retort, said retort being heated by a circulation of the gases of combustion from the furnace, after which the gases are treated for the recovery of valuable solids.

The invention is illustrated by way of example in the accompanying drawing in which:

Fig. 1 illustrates an apparatus by which the process may be carried out.

Fig. 2 illustrates a battery of furnaces showing the draft arrangement.

In the drawings, 10 indicates an incinerating furnace built substantially as disclosed in the patent above referred to. This furnace has a side wall 11 covered by an arch-shaped dome 12. Within the furnace a hearth 13 is formed and carries a set of grate bars 14. This structure is disposed along one side of the furnace so that the flames from the material burning thereupon may pass across the furnace to a flue opening 15 leading outwardly and upwardly to a stack 16. Formed alongside of the hearth is a floor 17 carrying track rails 18. A dump car 19 is adapted to move along these rails and to carry material into and out of the furnace when desired. This car is preferably provided as a loading platform onto which the material to be destroyed is deposited from a feed opening 20 in the dome portion of the furnace. The opening 20 communicates with a retort or drying hopper 21 separated from the opening by means of a sliding fireproof door 22 which is preferably carried upon side tracks 23. The retort has downwardly converging side walls formed of fireproof material and adapted to withstand the heat of the gases of combustion passing upwardly through the stack and into the retort through the pipe 24. This pipe communicates with the retort near the bottom thereof. Combined closing and feed members 25 are hinged at the top of the retort and normally separate it from a feedhopper 26 in the manner described in our patent previously referred to.

In order to conserve a portion of the heat passing through the retort, water-backs 27 are disposed along the inner faces of the side walls and in spaced relation thereto. This structure may be connected to any desired apparatus, either for heating or power purposes. At the same time the pipes will form a circulating space between through which the products of combustion from the furnace may pass and by which means a more thorough distribution of the gas will be effected, thus uniformly drying the material in the retort. On the opposite side of the retort from the inlet pipe 24 and near the top thereof is an outlet pipe 28. This pipe connects with a suitable circulating fan or motor 29 by which a suction draft is created through the furnace and the retort and from which the gases are caused to travel along a conduit 30 leading to a reclaiming apparatus 31. It will be understood that while the structure 31 is here shown in a diagrammatical manner, that it may be possible to interpose any means for clarifying the gases and recovering the desirable solids therefrom, after which the clarified gas may be returned to the cleaning hopper 32 of the furnace through a pipe 33. The hopper 32 is formed in the bottom of the floor 17 of the furnace and has downwardly converging side walls which will act to receive the ashes and solid particles falling through the truck 19. This solid matter may then be carried away through a screw conveyer 34 or any other conveying means found convenient. Suitable air inlets are provided, as, for example, openings through and beneath the charging door as shown in Figure 2. Condensate which may accumulate in pipe 33 is drawn off through pipe 33'. A blower 35 is provided and connected with pipe 33. This blower communicates with the furnace, preferably at a point beneath the grate bars 14, and also by means of a pipe 37 extending beneath the car 19.

In carrying out the present invention, it may be understood that a plurality of incinerating furnaces may be arranged, as indicated in Fig. 2 of the drawings, and thus the capacity of a plant may be increased by multiplication of the incinerating units rather than the increase in capacity of a single unit. Due to this structure, one of the furnaces may be used, if desired, or all may be set in operation and placed in communication with each other and the flues, or if desired, the furnaces may be separately connected with their individual flues and operation of any one of the units discontinued, thus making it possible to maintain the incinerating plant in operation continuously, at the same time providing for repairs and the cleaning of the separate units. When the furnace is set in operation, a load of garbage is delivered to the car 19, either through the hopper 21 or by a manual delivery. A fire may be then started upon the grate bars 14 or suitable burners may be provided which use liquid or gaseous fuel. The flame will be caused to pass horizontally and vertically due to the fire box construction and the flue position. At the same time that combustion takes place in the grate area, gases are being delivered to the bottom of the furnace by means of the pipe 37. A further draft may be brought about by control of air passage through and around the front firing door of the furnace. The flames will pass upwardly around the dome and at the same time will pass around and be reflected in a horizontal plane. As the gases from pipe 33 pass up around and through the car 19, they will tend to lift the gases and vapor escaping from the garbage and force this gas upwardly into the top of the furnace dome. In many instances the products of combustion from the garbage will have a very low ignition point and will be forced upwardly by a bank of fresh air passing in through an air vent in the firing door and also under the truck and through the pipe 33, to be ignited against the extremely hot wall of the furnace dome. Thorough ignition is assured, due to the fact that the flame from the grate 14 is passing in a horizontal path of travel and within the dome, at the same time being acted upon by the upwardly flowing air so that a constant agitation of the gas will be effected and the products of combustion rising from the garbage will thus be thoroughly intermingled with the burning gas. This intermingling action will insure that a substantially complete combustion of the garbage will take place within the furnace. Due to this fact, the gas passing outwardly through the flue opening 15 and upwardly through the stack 16 will be practically free from odor and will therefore represent gas resultant from a desirable combustion of the material within the furnace.

By regulation of a damper 16' upon the top of the stack, the gases passing through the stack 19 may be controlled and diverted in any volume desired to the pipe 24. As this gas is dry, it will act readily to dehydrate the garbage within the hopper or retort 21 and will carry off the vapor and greasy matter suspended therein as it passes to the pipe 28. This will place the material within the retort in a condition for ignition so that when the door 22 is moved aside the material will fall upon the car 19 and will burn, due to the intense heat within the furnace, this heat being caused by the burning gases in the dome. Experience has proven that after the furnace has been raised to its proper temperature, it may be maintained in operation by the burning of the garbage upon the car 19 and the combustion of the gases in the dome of the furnace. As the gas passes from the retort 21, it will be delivered from pipe 28 to pipe 30 by means of the fan 29, this pipe being in direct communication with a clarifier or other apparatus for the cleaning of the gas and the recovery of valuable matter suspended therein. The clarified gas is then returned to the furnace through the pipe 33 and may thereafter co-mingle with the air being admitted through and around the firing door as well as the gases created within the furnace. Thus it will be assured that a very desirable destruction of the material and its gases will be effected. As the process is continued, an accumulation of non-combustible material will take place upon the car and this may be carried out on the car. The ashes thereafter will be carried away by the conveyer 34. It will be understood that this conveyer may be of a screw type, as shown, or may be a belt conveyer elevating the ashes to a convenient point.

In the event that water vapor passes off through the pipe 33, it may be desirable to provide a trap 33' connected with a sewer, through which the condensed vapor may be carried away.

Attention is directed to the fact that in the performance of the apparatus here disclosed, in the manner described, a very high grade of potash will be obtained. This is due to the fact that the most intense heat in the furnace is along the dome thereof. Thus, the temperature will be gradually lowered near the top of the truck and will be considerably below a burning temperature at the bottom of the furnace. In this manner it is possible to produce a desirable destruction of the material and to carry the ash therefrom without allowing it to remain in an intense destructive heat.

It will thus be seen that the process here disclosed, while quite simple, at the same time provides that garbage and other refuse may be destroyed with a minimum amount of fuel; that the valuable fats and oils within the garbage may be recovered, as well as the potash, all of which operation and recovery will be accomplished without throwing greasy smoke of objectionable odor into the atmosphere.

While we have shown the preferred steps in our process, it will be understood that various changes might be made by those skilled in the art, without departing from the spirit of the invention as claimed.

The hopper or retort 21 is provided with a condensation drain 21' through which the condensed greases and acids may be drained from the dehydrating material, thus causing a direct recovery of a certain portion of the by-products of the garbage.

Having thus described our invention, what we claim and desire to secure by Letters Patent is:—

1. A process of garbage incineration which consists in burning garbage in a furnace, passing a part of the hot gases of combustion from the furnace through a mass of raw garbage at a point exterior of the furnace whereby the raw garbage will be dried, thereafter feeding the raw garbage to the furnace for burning, drawing off the gases incident to the drying of the raw garbage, clarifying the same and delivering the clarified gases to burn with the previously dried garbage.

2. The process of garbage incineration which consists in burning raw garbage in a furnace, drawing off the gases of combustion through a flue, diverting a desired volume of these gases through a mass of raw garbage disposed at a point exterior of the furnace and by which gases the raw garbage will be dehydrated, thereafter feeding the dried garbage to the furnace for destruction, drawing off the gases from the raw garbage, passing the same to clarifying means and then delivering these gases to the furnace to burn with the previously dehydrated garbage.

In testimony whereof we have hereunto set our hands in the presence of two subscribing witnesses.

FREDERICK H. COLLINS.
MARTIN L. PELLETT.

Witnesses:
W. W. HEALEY,
W. E. EWING.